July 9, 1968 K. STEISSLINGER ET AL 3,391,622
PHOTOGRAPHIC CAMERA WITH FLASH UNIT
Filed Aug. 5, 1965 2 Sheets-Sheet 1

KURT STEISSLINGER
HORST SIMON
INVENTORS

BY R. Frank Smith
Thomas R. Langee
ATTORNEYS

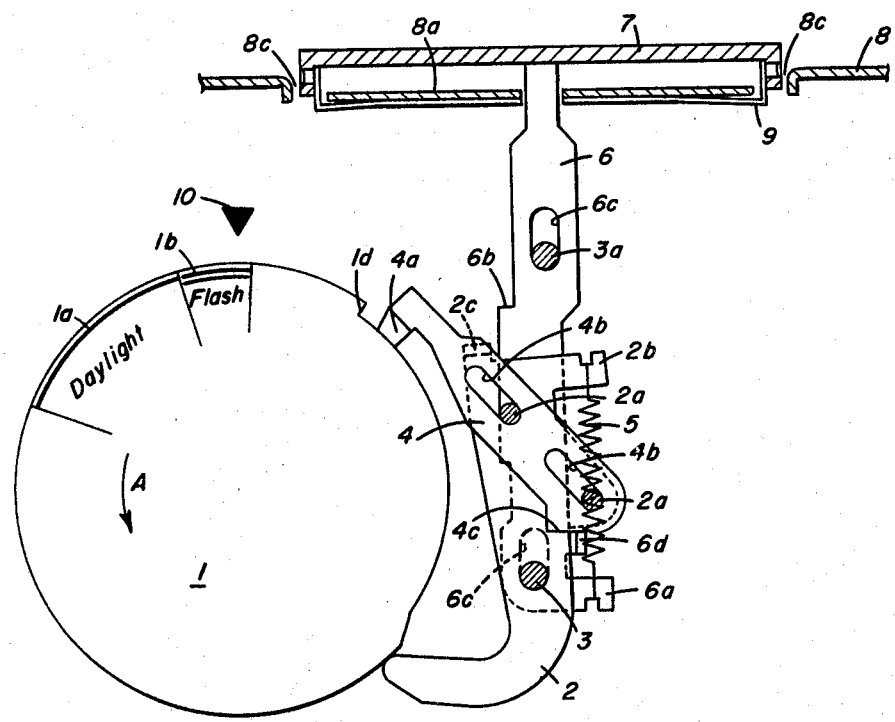

United States Patent Office 3,391,622
Patented July 9, 1968

3,391,622
PHOTOGRAPHIC CAMERA WITH FLASH UNIT
Kurt Steisslinger, Stuttgart-Hedelfingen, and Horst Simon, Fellbach, near Stuttgart, Germany, assignors to Eastman Kodak Company, Rochester, N.Y., a corporation of New Jersey
Filed Aug. 5, 1965, Ser. No. 477,388
Claims priority, application Germany, Dec. 24, 1964, K 49,914
8 Claims. (Cl. 95—11)

ABSTRACT OF THE DISCLOSURE

A flash unit in a camera with a reflector which may be folded to a retracted position in a recess and held therein by resilient biasing member when flash operation is not desired. The flash unit also has a device for rendering the reflector accessible by actuation of a setting member to thereby release a transmission mechanism which overcomes the biasing member so as to permit the reflector to be withdrawn from the recess when the flash is to be operated.

---

The present invention relates to a flash unit adapted for use with a photographic camera. More specifically, a flash unit is disclosed having a folding reflector which, in its inoperative position, is in alignment with the periphery of the associated camera, and is held in said inoperative position, as well as its operative position, by a resilient biasing means. Actuator means is disclosed for positioning said flash unit.

Built-in flash units have long been employed in combination with photographic cameras. In order to render use of the camera more convenient and to protect such units when they are not being used, a recess has often been provided in the camera to store the unit until it is brought to operative position by the operator. In certain conventional arrangements, the reflector associated with such units is moved manually into operative position when use is desired and into the recess for storage purposes. In arrangements of this type, a tab or other portion of the reflector projects over the periphery of the camera so that it may be gripped by the operator. Such an arrangement impairs the appearance of the camera and increases the possibility of accidental movement of the reflector out of storage position.

Other systems are also known wherein the entire flash unit, or a portion thereof, is moved from its recessed position and propelled at least partially to its operative position by biasing means. In this type of system the operator withdraws a latch or actuates a lever means to allow movement of the unit under the influence of the biasing means. Once again, accidental displacement of the flash unit from its inoperative position is an ever present possibility.

When flash units have been employed with cameras having variable aperture or exposure time setting means, linkages have been devised which automatically move the reflector and its associated lamp socket into operative position and back to rest position upon movement of the aperture or exposure time setting member. In devices of this type, the entire unit is moved to use position when either the aperture or exposure time members are set for values corresponding to flash conditions. Such a design precludes use of the built-in flash in certain situations where such use is desired; for example, use of the flash unit to fill in shadows where daylight conditions prevail. Moreover, the movable support of the lamp socket increases production costs and heightens susceptibility of the unit to breakage.

It is therefore an object of this invention to provide an improved flash unit for use with photographic cameras which is simple, compact in construction, and of a design substantially lessening the danger of inadvertent withdrawal from the associated camera recess.

These objects have been attained by providing a flash unit which incorporates a foldable reflector which is normally biased into an inoperative position in alignment with the periphery of its associated camera and wherein means is provided for raising the reflector against the biasing means to a position where it can be manually grasped and placed in its operative position by the operator.

Other objects of the invention will appear from the following description, reference being made to the accompanying drawings wherein:

FIG. 2 is a view similar to that of FIG. 1 but showing the elements of the invention in the position assumed when flash conditions are encountered.

Figure 1:
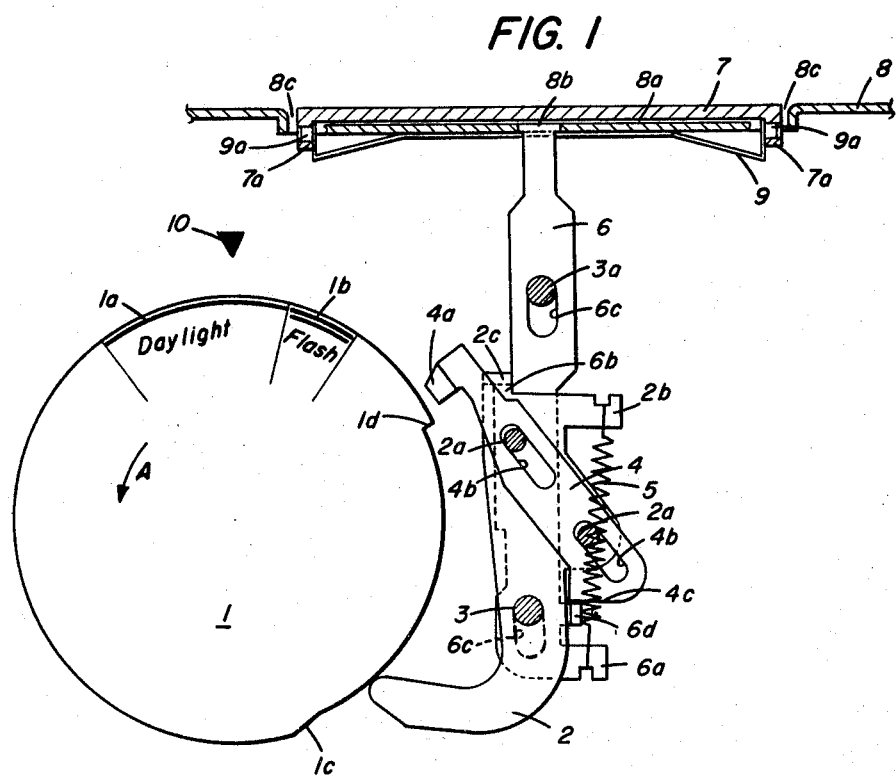
FIG. 1 is a frontal view showing the elements of the invention in the position assumed when daylight conditions are encountered.

Referring now to FIG. 1, a setting member 1, comprising a disc, is shown which is normally disposed in a camera housing 8 and may be coupled for rotatable movement in any desired manner to the camera variable aperture or exposure time setting means (not shown) or, in the alternative, positioned in such a manner as to be manually rotated by the operator. Setting member 1 is provided with a cam 1c and projection 1d for the purpose to be brought out below. Disposed adjacent setting member 1 is a transmission mechanism. The transmission mechanism includes a lever 2 mounted for pivotal motion about bolt 3 which is fixedly mounted on the camera housing 8. Lever 2 has an elongated foot on the lowermost portion thereof in contact with said setting member. Lever 2 has integrally mounted thereon pins 2a which project through cooperating slots 4b in slide member 4 permitting said slide member to be slidably displaced with respect to said lever 2 and rotated therewith in the event of pivotal motion of said lever under the influence of said setting member.

A transmission member 6 is disposed adjacent lever 2 and is mounted for reciprocable motion on the camera housing through the expedient of bolts 3 and 3a projecting from the housing and slots 6c in said transmission member. A projection 6a projects from the lowermost portion of transmission member 6 and has attached thereto a spring 5. The other end of spring 5 is attached to projection 2b which projects from the uppermost portion of lever 2. Spring 5 serves to bias lever 2 in a clockwise direction about bolt 3 with respect to transmission member 6. When the various elements are in their inoperative positions as shown in FIG. 1, relative motion between lever 2 and transmission member 6 under the bias of spring 5 is halted by the engagement of an integral angular portion 2c of lever 2 with the side of transmission member 6. It is of course understood that the angular portion extends inwardly and is of a length sufficient to engage transmission member 6. It should be noted also that angular portion 2c extends over and is matingly engaged with an integral lug 6b on said transmission member 6 when said device is in inoperative position. Transmission member 6 also has an angular element or lug 6d disposed thereon in proximity to lug 6a and projecting outwardly therefrom (as viewed in FIGS. 1 and 2). Lower surface 4c of slide member 4 engages said outwardly projecting lug 6d so that upward movement of said lug causes a corresponding upward angular movement of said slide member.

Disposed above the above-described mechanism is a reflector 7 which, while in its inoperative position, is housed in recessed portion 8a of camera housing 8. Reflector 7 is pivotally mounted on pins 9a which are fastened to the upturned ends of leaf spring 9. A slot 8b is formed in the recessed portion of the camera housing to allow passage therethrough of the upper portion of transmission member 6. It is readily apparent that when said reflector 7 is in its inoperative state flanges 7a of the reflector are disposed in slots 8c formed in recessed portion 8a in opposition to one another.

The operation of the device will now be described. It should be noted that settling member 1 has indicia thereon identifying daylight range 1a and flash range 1b. Index mark 10 serves as a reference point to properly identify the conditions for which the camera is to be used. It may be seen with reference to FIG. 1 when daylight conditions are encountered the reflector 7 is retained in recessed portion 8a undre the influence of leaf spring 9. By turning settling member 1 in the direction of arrow a thereby setting the flash operation range 1b to index mark 10, cam 1c contacts lever 2 and pivots said lever about bolt 3 in a counterclockwise direction against the bias of spring 5. Angular portion 2c then releases lug 6b allowing transmission member 6 to move upward under the influence of spring 5. The uppermost portion of the transmission member extends through slot 8b (FIG. 2) thereby partially raising reflector 7 against the bias of leaf spring 9. It is understood, of course, that leaf spring 9 is relatively weaker than spring 5.

After the reflector has been partially raised as shown in FIG. 2 the operator may grasp it to pull it upward to a fully raised position (not shown) or he may desire to leave it in its partially raised position, in which case the reflector and flash unit are still maintained in a protected, relatively safe condition. Although the reflector is not illustrated in its fully raised position, this condition should be quite clear. Flanges 7a of the reflector constitute bearing points which are under the continuous influence of leaf spring 9. The reflector is pivoted about said bearing points and when it reaches its fully raised, i.e., vertical position, leaf spring 9 biases the lowermost portion of the reflector in a vertical direction against the bottom wall of recessed portion 8a thereby providing frictional engagement between these two elements. The conventional lamp socket (not shown) is permanently positioned in said recess at any desired location and is adapted to accommodate a flash lamp in the customary fashion. After the operator is through with the flash unit, he merely removes the bulb and flicks the reflector forward so that the off center point is reached and leaf spring will complete the positioning of the reflector to its partially raised position as illustrated in FIG. 2.

In order to return the reflector to its fully recessed or inoperative position, setting member 1 is turned in a clockwise direction so that daylight range 1a is indexed as shown in FIG. 1. During the clockwise motion of the setting member, projection 1d contacts bevelled front end 4a of slide member 4 to move the slide member in a downward angular direction in accordance with the locations of slots 4b and pins 2a. Surface 4c by contacting angular element 6d of transmission member 6 also moves the transmission member downwardly and the uppermost portion thereof out of slot 8b. The reflector is then fully withdrawn to inoperative position by leaf spring 9. Simultaneous with the engagement of bevelled front end 4a of slide member 4 with projection 1d, lever 2 rides free of cam 1c and after sufficient downward movement of transmission member 6 angular portion 2c once again rides over lug 6b under the influence of spring 5 to retain the elements in their initial inoperative positions, as illustrated in FIG. 1.

Although only one specific embodiment of the present invention is disclosed herein, it should be understood that the particular form disclosed has been selected to facilitate explanation of the invention rather than to limit the number of forms which it may assume. Further, it should be understood that various modifications, alterations and adaptations may be applied to this specific form described to meet the requirements of practice without in any manner departing from the spirit or scope of the present invention.

What is claimed is:

1. In a photographic camera, the combination comprising:
   a flash unit including a reflector movable from a first position to a second position;
   a setting member positioned in accordance with scene light conditions and movable from a non-actuating position to an actuating position;
   a recessed portion in said camera for accommodating said reflector when said reflector is in its said first position;
   biasing means and means pivotally mounting said reflector on said biasing means with said biasing means continuously urging said reflector to its first position; and
   a transmission mechanism responsive to movement of said setting member to its actuating position for urging said reflector against said biasing means to its second position.

2. In a photographic camera, the combination comprising:
   a flash unit including a reflector movable from a first position to a second position;
   a setting member positioned in accordance with scene light conditions and movable from a non-actuating position to an actuating position, the setting member comprising a disc having a cam and a protrusion on the periphery thereof;
   a recessed portion in said camera for accommodating said reflector when said reflector is in its said first position;
   biasing means continuously urging said reflector to its first position; and
   a transmission mechanism responsive to movement of said setting member to its actuating position by contacting said cam to urge said reflector against said biasing means to its second position, and by contacting said protrusion upon movement of said setting member to its non-actuating position to permit said reflector to return to its first position under the influence of said biasing means.

3. In a photographic camera, the combination comprising:
   a flash unit including a reflector movable from a first position to a second position wherein said reflector may be manually grasped when in said second position and moved to a third position;
   a setting member positioned in accordance with scene light conditions and movable from a non-actuating position to an actuating position;
   a recessed portion in said camera for accommodating said reflector when said reflector is in its first said position;
   biasing means continuously urging said reflector to its first position when the reflector is in its first or second positions and said reflector and said biasing means being arranged to maintain said reflector in said third position when the reflector is moved to the third position; and
   a transmission mechanism responsive to movement of said setting member to its actuating position for urging said reflector against said biasing means to its second position.

4. In a photographic camera, the combination comprising:
   a flash unit including a reflector movable from a first position to a second position;
   a first biasing means urging said reflector toward its first position;
   a setting member movable from a non-actuating position to an actuating position;

a transmission member;

a second biasing means in operative association with said transmission member and biasing said transmission member from a first position to a second position where it contacts said reflector;

means responsive to movement of said setting member to its actuating position to allow said second biasing means to move said transmission member into contact with said reflector whereby said transmission member and said reflector are moved to their respective second positions against the continuous bias of said first biasing means.

5. The combination according to claim 4 wherein said setting member is a rotatable disc having suitable indicia thereon for aiding the positioning thereof by the operator.

6. The combination according to claim 4, wherein said camera has a recessed portion with a slot therein;

said reflector when in its said first position being housed in said recessed portion and said transmission member when in its second position entering said recessed portion through said slot.

7. The combination according to claim 6 wherein said first biasing means is a leaf spring mounted on said recessed portion.

8. The combination according to claim 7 wherein said leaf spring has two upturned ends having a portion thereof journalled in cooperating bearing surfaces on said reflector; said reflector when in said second position being positioned for manual movement to a third position; said recessed portion, said leaf spring and said bearing surfaces cooperating to maintain said reflector in said third position.

References Cited
UNITED STATES PATENTS

| | | | |
|---|---|---|---|
| 3,175,479 | 3/1965 | Beach et al. | 95—11 |
| 3,260,181 | 7/1966 | Henning et al. | 95—11 |
| 3,273,479 | 9/1966 | Jakob | 95—11 |

NORTON ANSHER, *Primary Examiner.*

F. L. BRAUN, *Assistant Examiner.*